Feb. 26, 1963 F. KLUMPP, JR 3,079,581
SELF LOCKING BUSHING
Filed Feb. 12, 1958 2 Sheets-Sheet 1
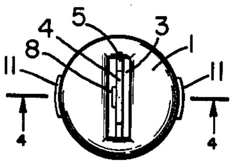
FIG. 2
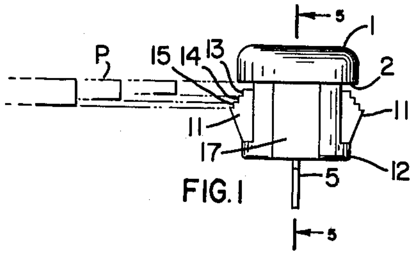
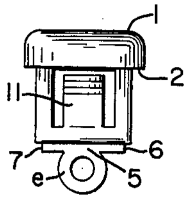
FIG. 3
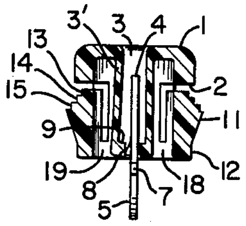
FIG. 6
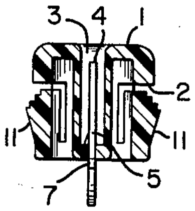
FIG. 4
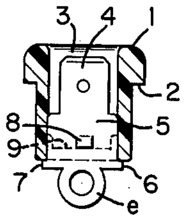
FIG. 5
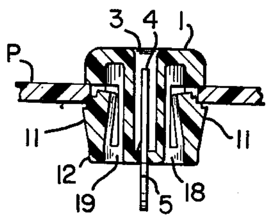
FIG. 7
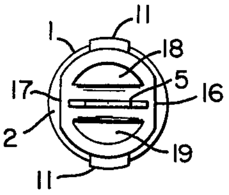
FIG. 8
INVENTOR.
FERDINAND KLUMPP JR
BY:
Albion D. T. Libby
ATTORNEY Feb. 26, 1963

F. KLUMPP, JR 3,079,581

SELF LOCKING BUSHING

Filed Feb. 12, 1958

2 Sheets-Sheet 2

INVENTOR.
FERDINAND KLUMPP JR

BY: Albion D. T. Libby

ATTORNEY 3,079,581
SELF LOCKING BUSHING
Ferdinand Klumpp, Jr., 691 Fairfield Way, Union, N.J.
Filed Feb. 12, 1958, Ser. No. 714,897
2 Claims. (Cl. 339—128)

This invention relates to a special type of an electrical bushing which is self locking in connection with mounting means and at the same time has special features for receiving and holding electrical contact devices. Some of the mounting means are disclosed in my Patent 2,424,757 of July 29, 1947. In this patent it is pointed out how the bushing is automatically held in plates or supports of different thickness, and after much study and many tests, I have found out how to make a combined integral bushing and contact terminal, which is especially adapted for many uses where a plurality of conductors are used to interconnect various kinds of devices.

My invention is set forth in the attached drawings taken with the following specification wherein:

FIGURE 1 is a side view of my new device.

FIGURE 2 is a top view of FIGURE 1.

FIGURE 3 is a side view of FIGURE 1.

FIGURE 4 is a sectional view on line 4—4 of FIGURE 2.

FIGURE 5 is a sectional view on line 5—5 of FIGURE 1.

FIGURE 6 is a sectional view similar to FIGURE 4 but showing a terminal moving into its locking and working position.

FIGURE 7 is a view similar to FIGURE 4, but showing the bushing being moved into a panel support.

FIGURE 8 is a bottom or end view of the bushing shown in FIGURE 1.

Figure 9:
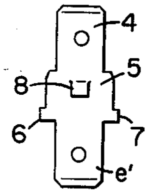
FIGURE 9 is a side elevation of one form of a contact terminal used in my new terminal bushing.
Figure 10:
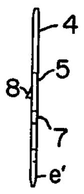
FIGURE 10 is an edge view of FIGURE 9.
Figure 11:
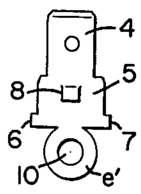
FIGURE 11 is a side elevation of another form of a contact terminal.
Figure 12:
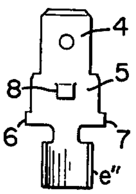
FIGURE 12 is a side elevation of another form of a contact terminal.
Figure 14:
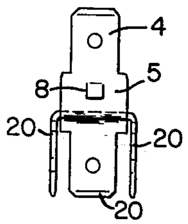
FIGURE 14 is a side elevation of another form of terminal in which extra contacts are used at one end.
Figure 13:
FIGURE 13 is a view of the lower end of FIGURE 12.
Figure 15:
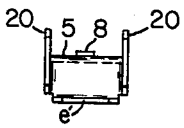
FIGURE 15 is an end view of FIGURE 14 looking upwardly.

From the foregoing it will be readily understood that this invention can take many forms and colors.

Coming now to the details, 1 is a body portion cast or moulded all in one piece from a suitable strong tough insulating material having some flexibility and of any desired color to meet the demands of customers.

In accordance with my invention I provide a body 1 having a top integral mounting flange 2. The body portion is provided with an opening 3 from which extends downwardly the well portion 3' the bottom portion of which terminates in a plane parallel to the bottom of the body portion. The well receives therein a terminal member 5 having an inner and upper end 4 and a terminal end portion *e* extending externally of the body. As best shown in FIGS. 3 and 4, the terminal is provided with a pair of arms or shoulders 6 and 7 which abut against the bottom of the well portion 3'. The terminal is provided with a tongue 8 which passes over the shoulder 9 at the bottom of the well to fix the terminal within the well portion. This prevents the terminal from being pulled out of the body portion when subjected to stresses. The lower end of the terminal *e* is secured to a conductor when mounted for use.

As shown in FIGS. 9 to 15, inclusive, the lower ends of the terminal have different forms as shown at *e'*, *e''* and 20, for engaging a conductor.

It will be noted from FIGURE 1 that the body 1 has flexible portions or fingers 11 which extend from their base portions 12 in an upwardly slanting direction toward the flange 2, two of these fingers being shown. These fingers have steps or shoulders 13, 14, and 15 for engaging plates P or supports of different thickness all as set forth in my patent above mentioned.

It will be seen from FIGURE 8 that the body has oppositely positioned flat portions 16 and 17 to prevent the bushing from being rotated in a mounting plate. In FIGURE 8 the numbers 18 and 19 show openings within the body 1 to allow the flexible finger 11 a chance to move inwardly while the bushing is being moved into place as shown in FIGURE 2 during the mounting, after which the fingers 11 will move into locking position as shown in FIGURE 1.

Figure 16:
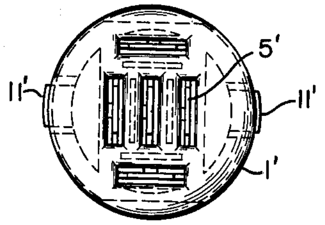
FIGURE 16 is a top view of a multiple terminal bushing.
Figure 18:
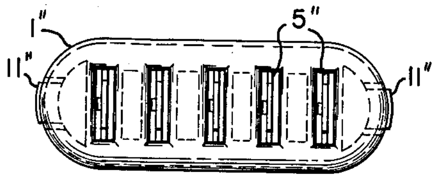
FIGURE 18 is a top view of an oval shaped multiple terminal bushing.
Figure 17:
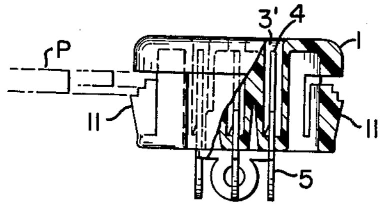
FIGURE 17 is a side view partially in section of FIGURE 16 showing the terminals in place.
Figure 19:
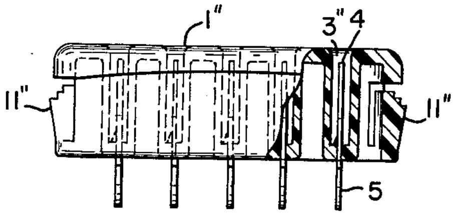
FIGURE 19 is a side elevation of FIGURE 18 partially in section showing the terminals in place.

From my work with the unitary device as shown in FIGURE 1 I have discovered that the unitary structure per se can be combined in various ways to accommodate a plurality of terminals as shown in FIGURES 16–19 and from these figures other shapes may appear, for example in FIGURES 16–17 which show a combination of five terminals such as shown in FIGURES 9–12 mounted in a manner similar to that shown in FIGURE 8. FIGURES 18 and 19 show five terminals mounted in a bushing in the form shown. In FIGS. 16 to 19, inclusive, similar parts are designated by prime (') and double prime ('') numerals corresponding to the same elements in FIGS. 1 to 8, inclusive. From the foregoing it will be seen that the number and shape of the mounting can be varied considerably.

Figure 20:
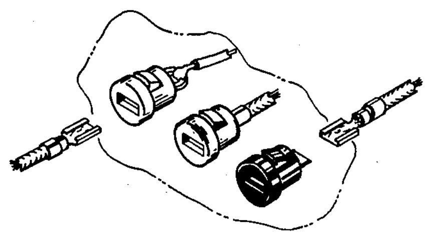
FIGURE 20 is a perspective view showing three different terminals and bushings made according to my invention and having different colors to cooperate with conductors having corresponding colors.

FIGURE 20 shows a plurality of bushings mounted so they can be used for various purposes, and to assist in this the colors may be different to receive wires having corresponding colors which are utilized in pieces of apparatus used in the trade to identify various circuits used in different pieces of appliances. FIGURE 20 also shows different means of making connections by differently formed terminals.

From the foregoing it should be readily understood that numerous changes in details can be made without departing from the spirit of my invention and the scope of the appended claims.

Having thus described my invention what I claim is:

1. A terminal bushing having a longitudinal axis and a peripheral wall extending in the direction of said axis, a mounting flange disposed transversely of said axis at one end of said wall, a plurality of separate elongated well portions extending longitudinally of said bushing within said flange, each said well portion having a bottom wall and oppositely disposed longitudinal walls spaced from portions of said peripheral wall and having a rectangular transverse cross section, each said bottom wall containing a narrow rectangular opening, said peripheral wall containing slots defining oppositely disposed flexible fingers spaced from said flange, from adjacent well portions and from portions of said peripheral wall, said fingers having stepped portions disposed opposite said flange for engagement with a panel received between said flange and fingers, a flat terminal of rectangular cross section extending through each said narrow rectangular opening having one end terminating in a well portion and an opposite end projecting longitudinally beyond said bushing, each said terminal having oppositely disposed shoulders engaging a surface of one of said bottom walls and a lug engaging an opposed surface of said one of said bottom walls.

2. A terminal bushing having a longitudinal axis and a peripheral wall extending in the direction of said axis, a mounting flange disposed transversely of said axis at one end of said wall, an elongated well portion extending longitudinally of said bushing within said flange, said well portion having a bottom wall and oppositely disposed longitudinal walls spaced from portions of said peripheral wall and having a rectangular transverse cross section, said bottom wall containing a narrow rectangular opening, said peripheral wall containing slots defining oppositely disposed flexible fingers spaced from said flange, from said well portion and from portions of said peripheral wall, said fingers having stepped portions disposed opposite said flange for engagement with a panel received between said flange and fingers, a flat terminal of rectangular cross section extending through said narrow rectangular opening having one end terminating in said well portion and an opposite end projecting longitudinally beyond said bushing, said terminal having oppositely disposed shoulders engaging a surface of said bottom wall and a lug engaging an opposed surface of said bottom wall.

References Cited in the file of this patent

UNITED STATES PATENTS

| | | |
|---|---|---|
| 2,147,239 | Buchanan | Feb. 14, 1939 |
| 2,352,618 | Daenz | July 4, 1944 |
| 2,420,826 | Irrgang | May 20, 1947 |
| 2,424,757 | Klumpp | July 29, 1947 |
| 2,559,759 | De Swart | July 10, 1951 |
| 2,664,552 | Ericsson et al. | Dec. 29, 1953 |
| 2,802,958 | Curley | Aug. 13, 1957 |
| 2,809,361 | Woofter et al. | Oct. 8, 1957 |
| 2,891,103 | Swengel | June 16, 1959 |